United States Patent
Hosogi et al.

(10) Patent No.: US 12,075,549 B2
(45) Date of Patent: Aug. 27, 2024

(54) HEATING COIL, HEATING APPARATUS AND MANUFACTURING METHOD OF WORKPIECE

(71) Applicant: NETUREN CO., LTD., Tokyo (JP)

(72) Inventors: Maho Hosogi, Tokyo (JP); Yoshimasa Tanaka, Tokyo (JP); Syoichiro Iwasaki, Tokyo (JP); Hideyuki Kozaki, Tokyo (JP); Yuuji Kodama, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 677 days.

(21) Appl. No.: 17/058,398

(22) PCT Filed: May 21, 2019

(86) PCT No.: PCT/JP2019/020089
§ 371 (c)(1),
(2) Date: Nov. 24, 2020

(87) PCT Pub. No.: WO2019/225596
PCT Pub. Date: Nov. 28, 2019

(65) Prior Publication Data
US 2021/0204370 A1    Jul. 1, 2021

(30) Foreign Application Priority Data
May 25, 2018   (JP) ................................. 2018-100577

(51) Int. Cl.
*H05B 6/36* (2006.01)
*H05B 6/10* (2006.01)

(52) U.S. Cl.
CPC ............... *H05B 6/36* (2013.01); *H05B 6/102* (2013.01)

(58) Field of Classification Search
CPC ........ H05B 6/102; H05B 6/103; H05B 6/104; H05B 6/36; Y02P 10/25
USPC ................................................... 219/672, 674
See application file for complete search history.

(56) References Cited

U.S. PATENT DOCUMENTS

| 4,845,328 A | * | 7/1989 | Storm ...................... C21D 1/10 336/225 |
| 5,428,208 A | * | 6/1995 | Chatterjee ................ C21D 9/32 219/674 |
| 2008/0264932 A1 | * | 10/2008 | Hirota .................... H05B 6/365 219/672 |

FOREIGN PATENT DOCUMENTS

| DE | 815 511 | 10/1951 |
| EP | 0 324 721 | 7/1989 |
| FR | 988 374 | 8/1951 |

(Continued)

OTHER PUBLICATIONS

International Search Report and Written Opinion of the International Searching Authority, issued Aug. 8, 2019 in corresponding International Patent Application No. PCT/JP2019/020089.

*Primary Examiner* — Dana Ross
*Assistant Examiner* — Joe E Mills, Jr.
(74) *Attorney, Agent, or Firm* — Wenderoth, Lind & Ponack, L.L.P.

(57) ABSTRACT

A heating coil is configured to induction heat a workpiece having a hole. The heating coil includes first and second heating units respectively having conductors. The conductors of the first and second heating units extend in inclination directions intersecting an axial direction and a circumferential direction of an outer peripheral surface of the workpiece.

9 Claims, 17 Drawing Sheets

(56) References Cited

FOREIGN PATENT DOCUMENTS

| JP | 2001-152242 | 6/2001 |
|----|-------------|--------|
| JP | 2001-192734 | 7/2001 |

* cited by examiner

HEATING COIL, HEATING APPARATUS AND MANUFACTURING METHOD OF WORKPIECE

TECHNICAL FIELD

The present invention relates to a heating coil and a heating apparatus used for induction heating of an outer peripheral surface of a workpiece having a cylindrical peripheral surface and having a hole extending in a central direction from the peripheral surface.

BACKGROUND ART

A return hole extending in a center direction is formed on an inner peripheral surface of a ball nut. When induction heating is applied to the inner peripheral surface of the ball nut in a state where the return hole is opened, an induced current flowing in a circumferential direction on a surface layer of the inner peripheral surface may be concentrated at edge portions of both sides of a periphery of the return hole that are opposed to each other in an axial direction of the inner peripheral surface, so that the edge portion where the induced current is concentrated may be overheated and melted. According to methods disclosed in JP2001-152242A and JP2001-192734A, induction heating is applied to an inner peripheral surface in a state where a plug made of copper or the like is inserted into a return hole so that overheating at an edge portion of a return hole is reduced or prevented.

Heating methods described in JP2001-152242A and JP2001-192734A require a large number of plugs for the induction heating of a large amount of workpieces and require a large number of man-hours to insert the plugs into the holes in the peripheral surface of the workpiece, which may lead to a decrease in productivity.

SUMMARY OF INVENTION

Illustrative aspects of the present invention provide a heating coil that is capable of reducing or preventing local overheating in a periphery of a hole formed on an outer peripheral surface of a workpiece to be inductively heated and that is capable of improving productivity.

DESCRIPTION OF EMBODIMENTS

Figure 1:
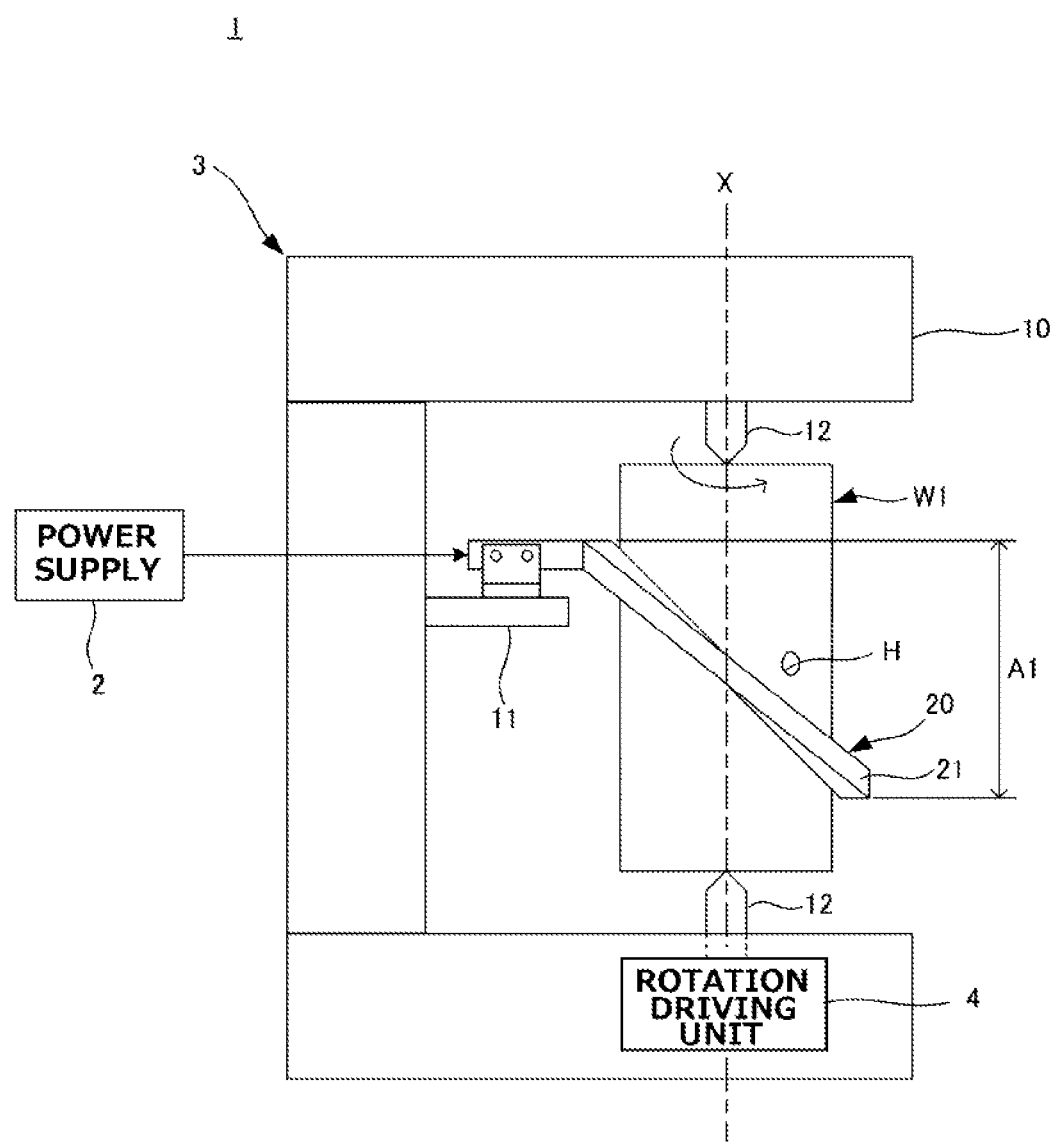
FIG. 1 is a schematic view of an example of a heating coil and a heating apparatus for illustrating an embodiment.
Figure 2:
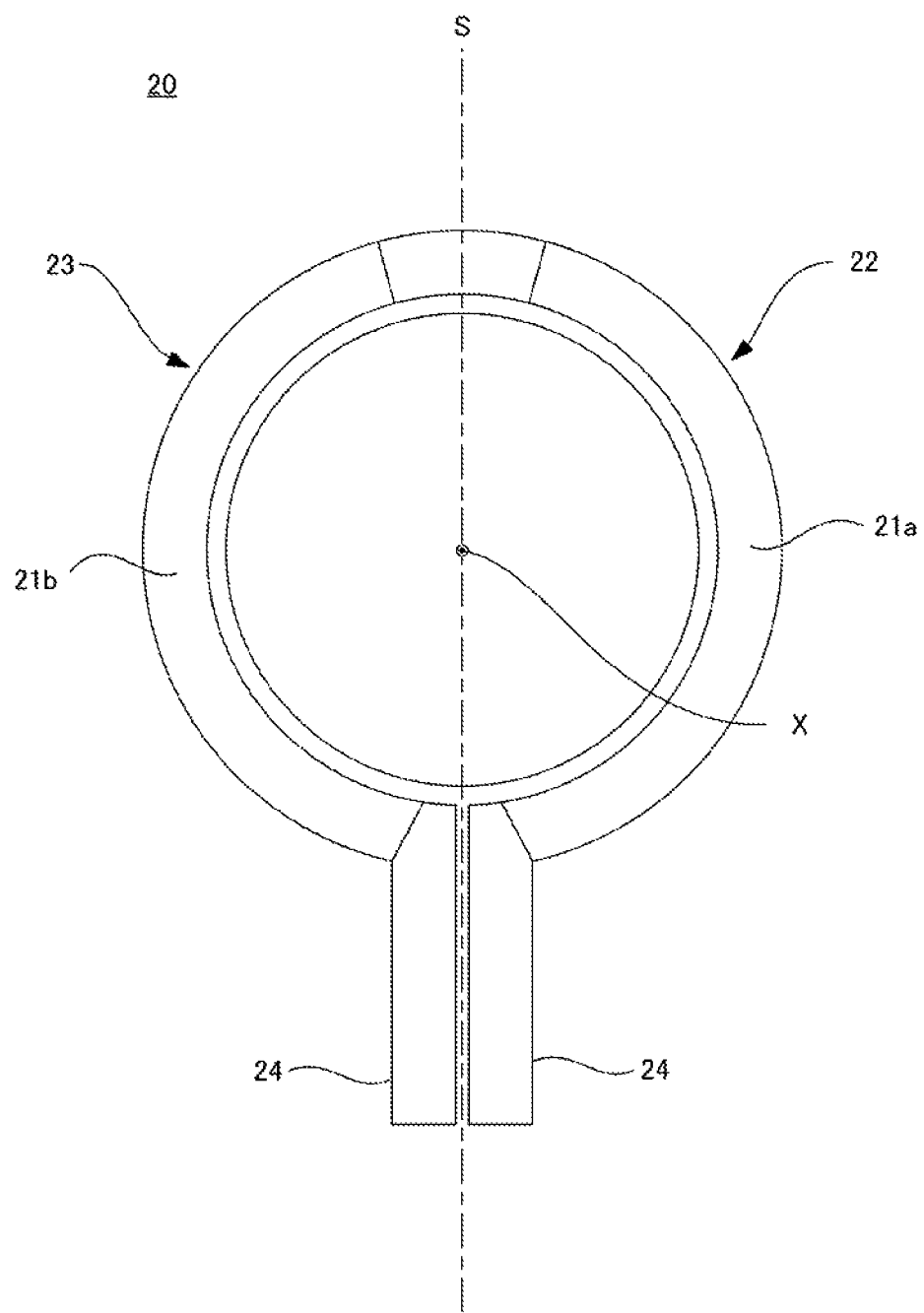
FIG. 2 is a top view of the heating coil in FIG. 1.
Figure 3:
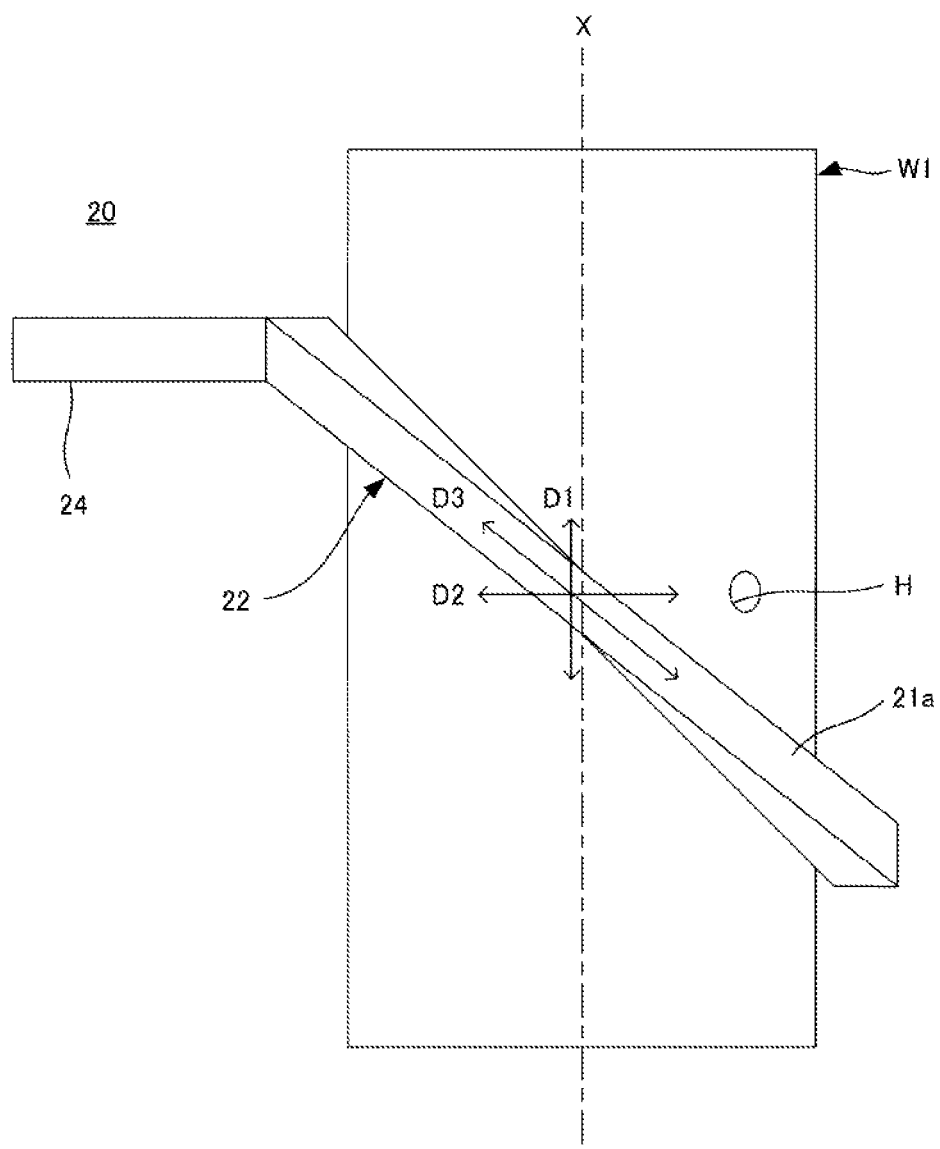
FIG. 3 is a left side view of the heating coil in FIG. 1.
Figure 4:
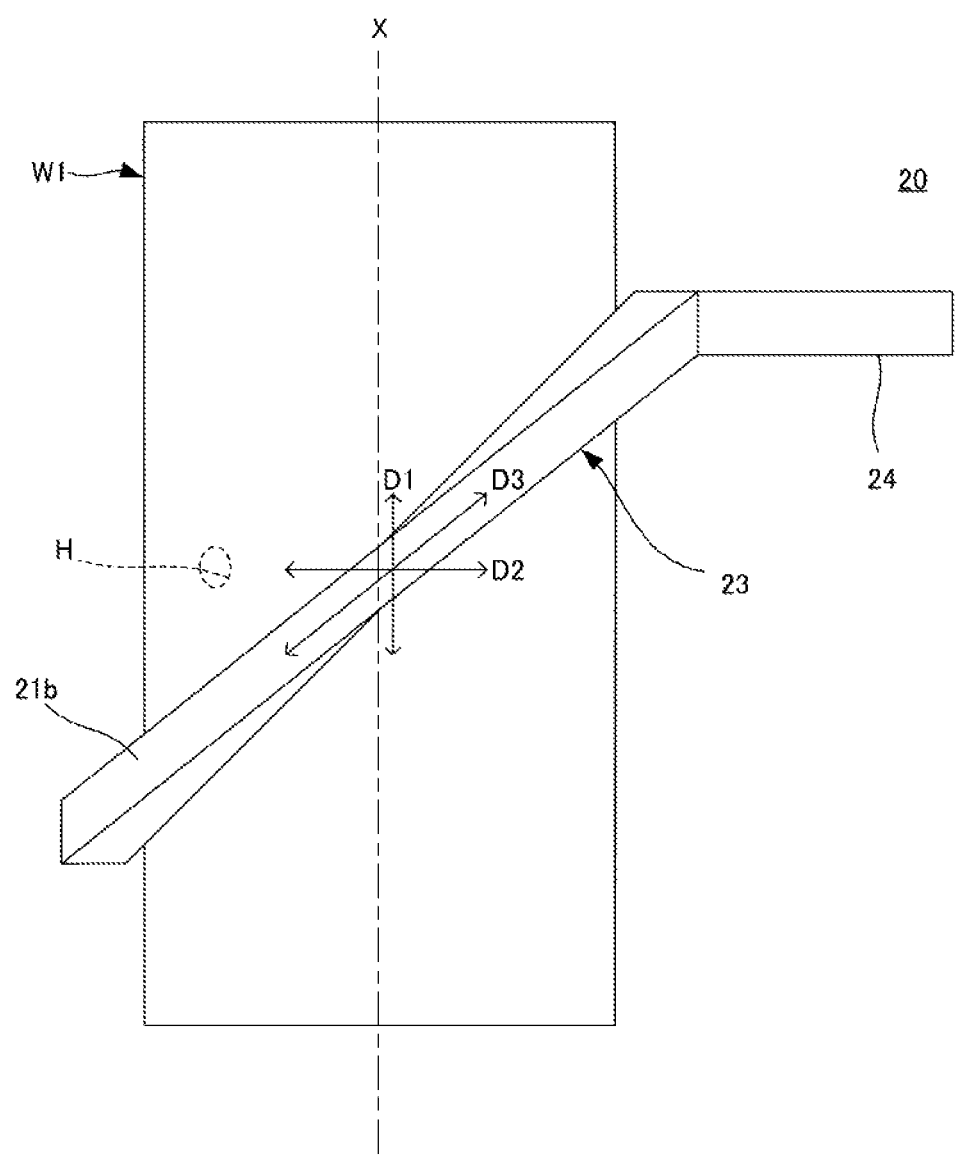
FIG. 4 is a right side view of the heating coil in FIG. 1.

FIG. 1 schematically illustrates an example of a heating coil and a heating apparatus for illustrating an embodiment. FIGS. 2 to 4 illustrate the heating coil in FIG. 1.

A heating apparatus 1 is a stationary heating apparatus that is configured to inductively heat an outer peripheral surface of a cylindrical workpiece W1. A hole H extending in a radial direction from the outer peripheral surface is formed in the workpiece W1. The hole H may be a through hole or a blind hole.

The heating apparatus 1 includes a heating coil 20 that is configured to inductively heat the outer peripheral surface of the workpiece W1, a power supply 2 that is configured to supply high frequency AC power to the heating coil 20, a supporting portion 3 that is configured to support the workpiece W1 and the heating coil 20, and a rotation driving unit 4 that is configured to rotate the workpiece W1 about a central axis X of the workpiece W1.

The heating coil 20 is configured such that a conductor 21 is wound along the outer peripheral surface of the workpiece W1. For example, a metal material such as copper is used as the conductor 21. In this example, the conductor 21 is formed of a tubular material. A continuous flow path is formed inside the heating coil 20 and a cooling medium which is water or the like is circulated through the flow path. The heating coil 20 heated by radiant heat of the inductively heated workpiece W1 is appropriately cooled by the cooling medium that is circulated therethrough.

As illustrated in FIGS. 2 to 4, the heating coil 20 includes a first heating unit 22 and a second heating unit 23. The first heating unit 22 includes a conductor 21a extending in an inclination direction D3 intersecting an axial direction D1 and a circumferential direction D2 of the workpiece W1. The second heating unit 23 also includes a conductor 21b extending in the inclination direction D1 The first heating unit 22 and the second heating unit 23 are symmetrical with respect to a symmetry plane S including the central axis X of the workpiece W1.

In this example, the conductor 21a of the first heating unit 22 and the conductor 21b of the second heating unit 23 are formed in a semicircular arc shape in top view. One end of each of the conductor 21a and the conductor 21b is connected to each other. Another end of each of the conductor 21a of the first heating unit 22 and the conductor 21b of the second heating unit 23 is connected to a pair of lead portions 24 which are similarly made of the conductor 21. The pair of lead portions 24 are electrically connected to the power supply 2 so that AC power is supplied, from the power supply 2 to the heating coil 20.

The first heating unit 22 and the second heating unit 23 may include a plurality of conductors extending in parallel to each other. In the example illustrated in FIGS. 5 and 6, the first heating unit 22 includes two conductors 21a1, 21a2 and the second heating unit 23 also includes two conductors 21b1, 21b2. The conductor 21a 1, the conductor 21b1, the conductor 21a2 and the conductor 21b2 are connected continuously in this order. The conductors 21a1 and the conductor 21b2 at two ends are connected to the pair of lead portions 24.

The support portion 3 includes a workpiece support portion 10 that is configured to support the workpiece W1, and a coil support portion 11 that is configured to support the heating coil 20.

The workpiece support portion 10 includes a pair pf centers 12 disposed on the central axis X of the workpiece W1 and is configured to support the workpiece W1 by sandwiching the workpiece W1 in the axial direction D1 by the pair of centers 12. The coil support portion 11 is configured to support the pair of lead portions 24 of the heating coil 20 in a fixed position. The first heating portion 22 and the second heating portion 23 of the heating coil 20 supported by the coil support portion 11 are disposed to oppose to each other on an area A1 that is formed with the hole H in the outer peripheral surface of the workpiece W1.

The rotation driving unit 4 is configured to rotationally drive the pair of centers 12 of the workpiece support portion 10. Accordingly, the workpiece W1 supported by the workpiece support portion 10 is rotated about the central axis X.

The workpiece W1 is rotated about the central axis X by the rotation driving unit 4 and the area A1 of the outer peripheral surface of the workpiece W1 on which the first heating unit 22 and the second heating unit 23 are disposed to oppose to each other is inductively heated over an entire circumference when the workpiece W1 is inductively heated by the heating apparatus 1.

Figure 7A:
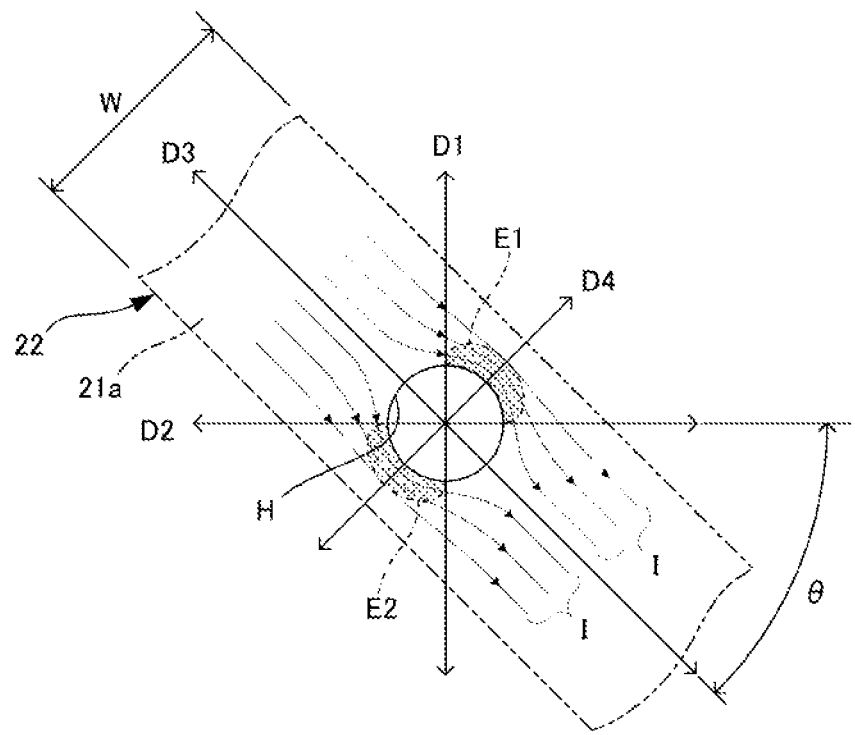
FIG. 7A is a schematic view illustrating an induced current flowing on a peripheral surface of a workpiece that is inductively heated by the heating apparatus in FIG. 1.
Figure 7B:
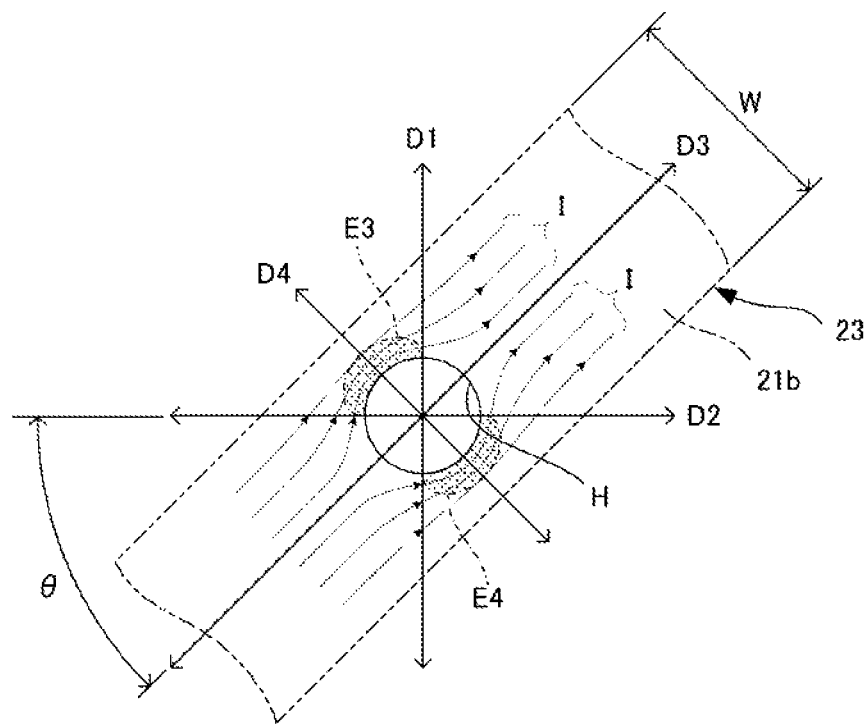
FIG. 7B is a schematic view illustrating the induced current flowing on the peripheral surface of the workpiece that is inductively heated by the heating apparatus in FIG. 1.

FIGS. 7A and 7B schematically illustrates an induced current flowing on the outer peripheral surface of the workpiece W1 that is inductively heated by the heating apparatus 1.

The induced current flows along the conductor 21a of the first heating portion 22 of the heating coil 20 and the conductor 21b of the second heating portion 23 of the heating coil 20 on a surface layer of the outer peripheral surface of the workpiece W1.

The conductor 21a of the first heating unit 22 extends in the inclination direction D3 intersecting the axial direction D1 and the circumferential direction D2 of the workpiece W1 as described above so that an induced current I flowing along the conductor 21a flows in the inclination direction D3 on the outer peripheral surface of the workpiece W1. The conductor 21b of the second heating unit 23 also extends in the inclination direction D3 so that the induction current 1 flowing along the conductor 21b flows in the inclination direction D3 on the outer peripheral surface of the workpiece W1.

In a state where the hole H of the workpiece W1 overlaps the conductor 21a of the first heating unit 22 illustrated in FIG. 7A, the induced current I flowing along the conductor 21a flows so as to bypass the hole H. In this case, a current density is relatively increased in edge portions E1, E2 on two sides of a periphery of the hole H that are opposed to each other in a direction D4 orthogonal to the inclination direction D3.

In a state where the workpiece W1 is rotated about the central axis X so that the hole H of the workpiece W1 overlaps the conductor 21b of the second heating unit 23 illustrated in FIG. 7B, the induced current I flowing along the conductor 21b flaws so as to bypass the hole H. In this case, a current density is relatively increased in edge portions E3, E4 on two sides of a periphery of the hole H that are opposed to each other in the direction D4 orthogonal to the inclination direction D3.

Here, the first heating unit 22 (Conductor 21a) and the second heating unit 23 (conductor 21b) are symmetrical with respect to the symmetry plane S including the central axis X of the workpiece W1 as described above. When an angle between the circumferential direction D2 of the workpiece W1 and the inclination direction D3 in which the conductor 21a of the first heating unit 22 and the conductor 21b of the second heating unit 23 extend is θ, the edge portion E1 at which the current density of the induced current I flowing along the conductor 21a increases and the edge portion E3 at which the current density of the induced current I flowing along the conductor 21b increases are in a positional relationship of rotating by an angle 2θ about a center of the hole H. Similarly, the edge E2 and the edge E4 are in the positional relationship of rotating by the angle 2θ about the center of the hole H.

An increase in the current density of the induced current I at the periphery of the hole H alternately occurs between the edge portions E1, E2 and the edge portions E3, E4 according to the rotation of the workpiece W1 so that the current densities of the induced current I at the edge portions E1, E2 and the edge portions E3, E4 are offset from each other as described above, thereby the local overheating at the periphery of the hole H is reduced or prevented.

From a viewpoint of reducing or preventing the local overheating of the periphery of the hole H, it is preferable that an overlap between the edge portion E1 and the edge portion E3 and an overlap between the edge portion E2 and the edge portion E4 are as small as possible. The angle θ formed between the circumferential direction D2 of the workpiece W1 and the inclination direction D3 in which the conductor 21a of the first heating unit 22 and the conductor 21b of the second heating unit 23 extend is preferably 40° or more and 50° or less, and more preferably 45°.

The width W of the conductor 21a of the first heating unit 22 and the conductor 21b of the second heating unit 23 is preferably larger than a diameter of the hole H of the workpiece W1, and more preferably not less than 2 times the diameter of the bole H and not more than 3 times the diameter of the hole H. The width W of the conductors 21a, 21b refers to a dimension in the direction D4 orthogonal to the inclination direction D3 in which the conductors 21a, 21b extend, For example, when the width W of the conductor 21a is larger than the diameter of the hole H in the state where the hole H overlaps the conductor 21a of the first heating unit 22, a part of the induction current I flowing along the conductor 21a flows outside the edge E1 and/or the edge E2 so that the increase in the current density at the edge portions E1, E2 is reduced or prevented. Accordingly, local overheating at the periphery of the hole H is further reduced or prevented.

Figure 8:
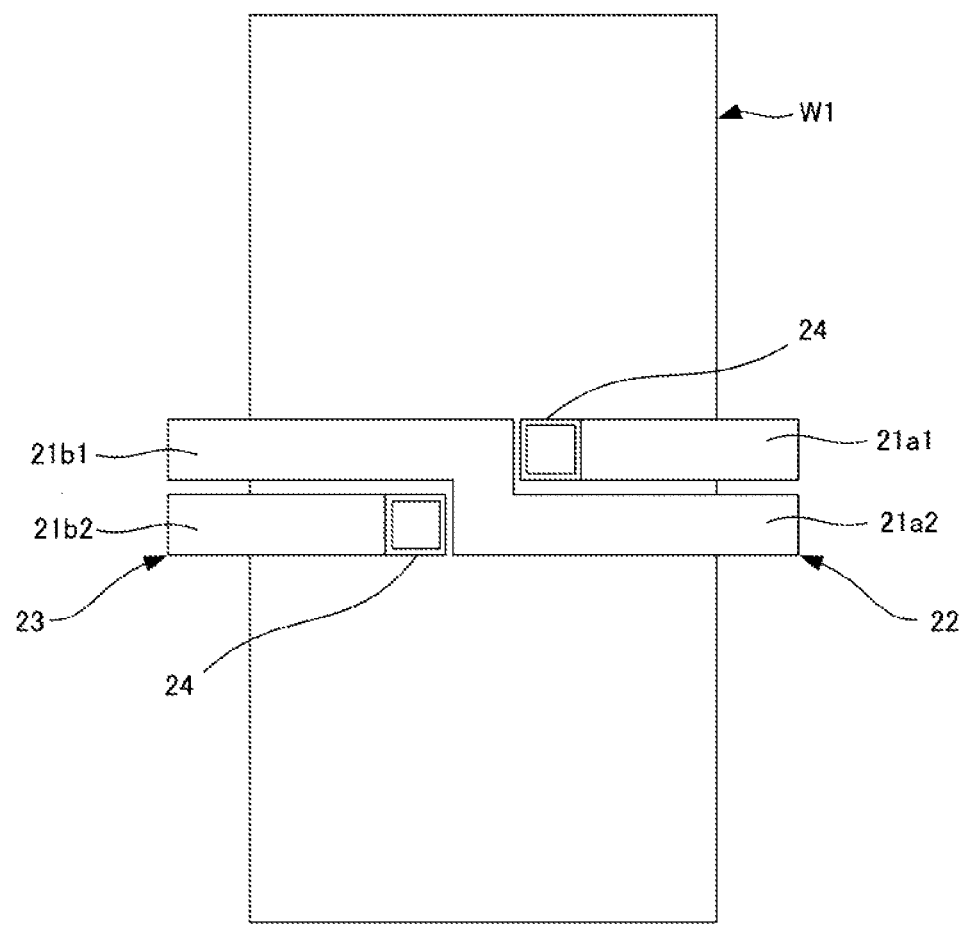
FIG. 8 is a front view of a heating coil according to a reference example.
Figure 9A:
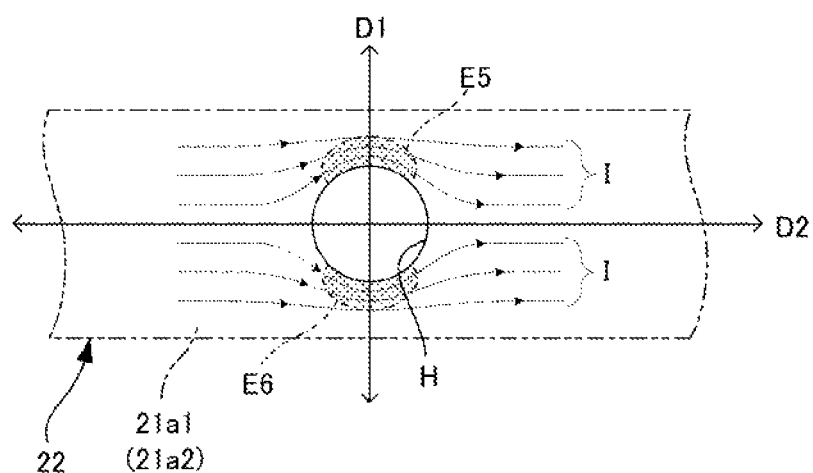
FIG. 9A is a schematic view illustrating the induced current flowing on the peripheral surface of the workpiece in a case of induction heating using the heating coil in FIG. 8.
Figure 9B:
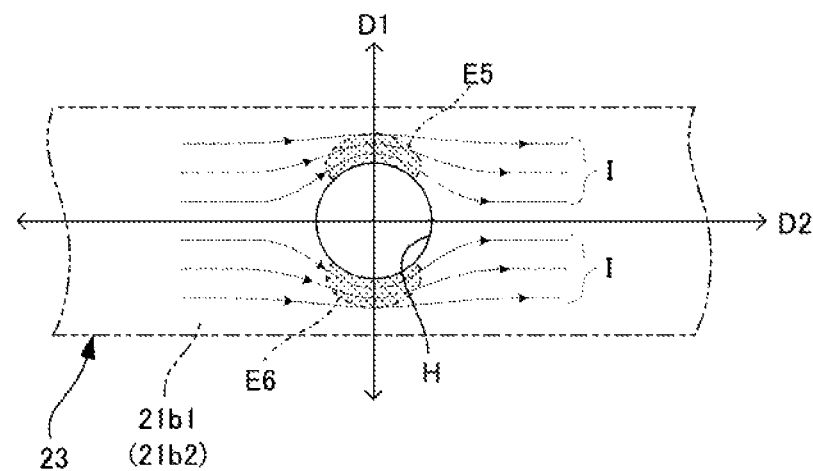
FIG. 9B is a schematic view illustrating the induced current flowing on the peripheral surface of the workpiece in the case of induction heating using the heating coil in FIG. 8.

FIG. 8 illustrates a heating coil of a reference example. FIGS. 9A and 9B schematically illustrate an induced current flowing on the outer peripheral surface of the workpiece W1 when the workpiece W1 is inductively heated using the heating coil in FIG. 8.

In the heating coil illustrated in FIG. 8, the conductor 21*a*1, 21*a*2 of the first heating unit 22 and the conductors 21*b*1, 21*b*2 of the second heating unit 23 are disposed substantially in parallel with the circumferential direction D2 of the workpiece W1. In this case, as illustrated in FIGS. 9A and 9B, the induced current I is concentrated on edge portions E5, E6 on two sides of a periphery of the hole H that are opposed to each other in the direction orthogonal to the circumferential direction D2, that is, in the axial direction D1, so that the edge portions E5, E6 are overheated regardless of the rotation of the workpiece W1.

Figure 10:
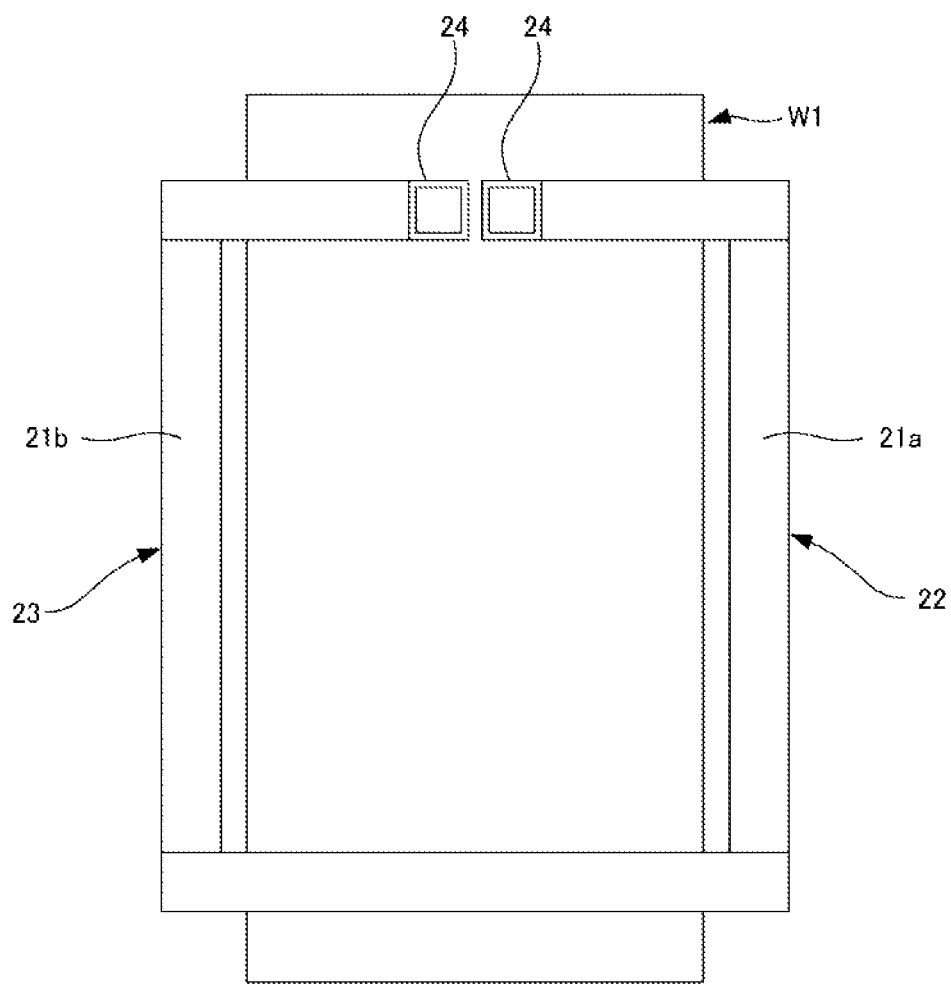
FIG. 10 is a front view of a heating coil according to another reference example.
Figure 11A:
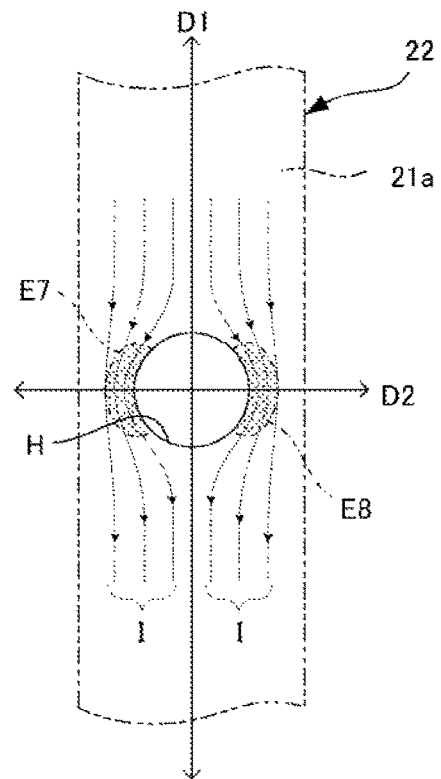
FIG. 11A is a schematic view illustrating the induced current flowing on the peripheral surface of the workpiece in a case of induction heating using the heating coil in FIG. 10.
Figure 11B:
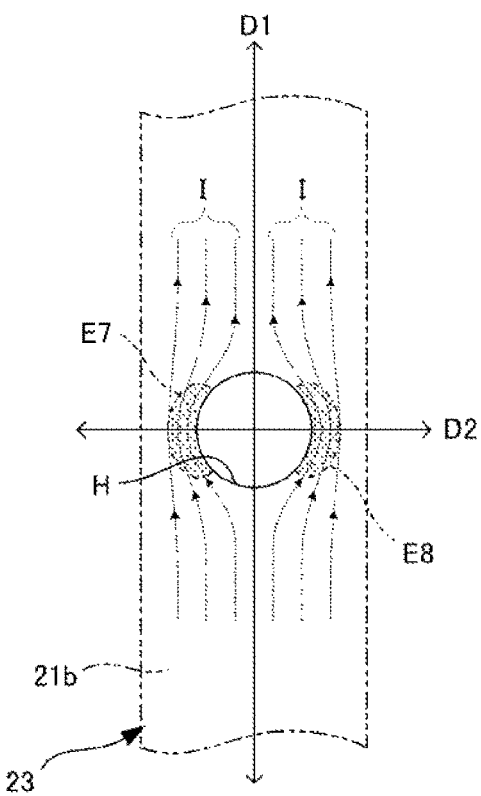
FIG. 11B is a schematic view illustrating the induced current flowing on the peripheral surface of the workpiece in the case of induction heating using the heating coil in FIG. 10.

FIG. 10 illustrates a heating coil of another reference example. FIGS. 11A and 11B schematically illustrate an induced current flowing on the outer peripheral surface of the workpiece W1 when the workpiece W1 is inductively heated using the heating coil in FIG. 10.

In the heating coil illustrated FIG. 10, the conductor 21*a* of the first heating unit 22 and the conductors 21*b* of the second heating unit 23 are disposed substantially in parallel with the axial direction D1 of the workpiece W1. In this case, as illustrated in FIGS. 11A and 11B, the induced current I is concentrated on edge portions E7, E8 on two sides of a periphery of the hole H that are opposed to each other in the direction orthogonal to the axial direction D1, that is, in the circumferential direction D2, so that the edge portions E7, E8 are overheated regardless of the rotation of the workpiece W1.

Figure 12:
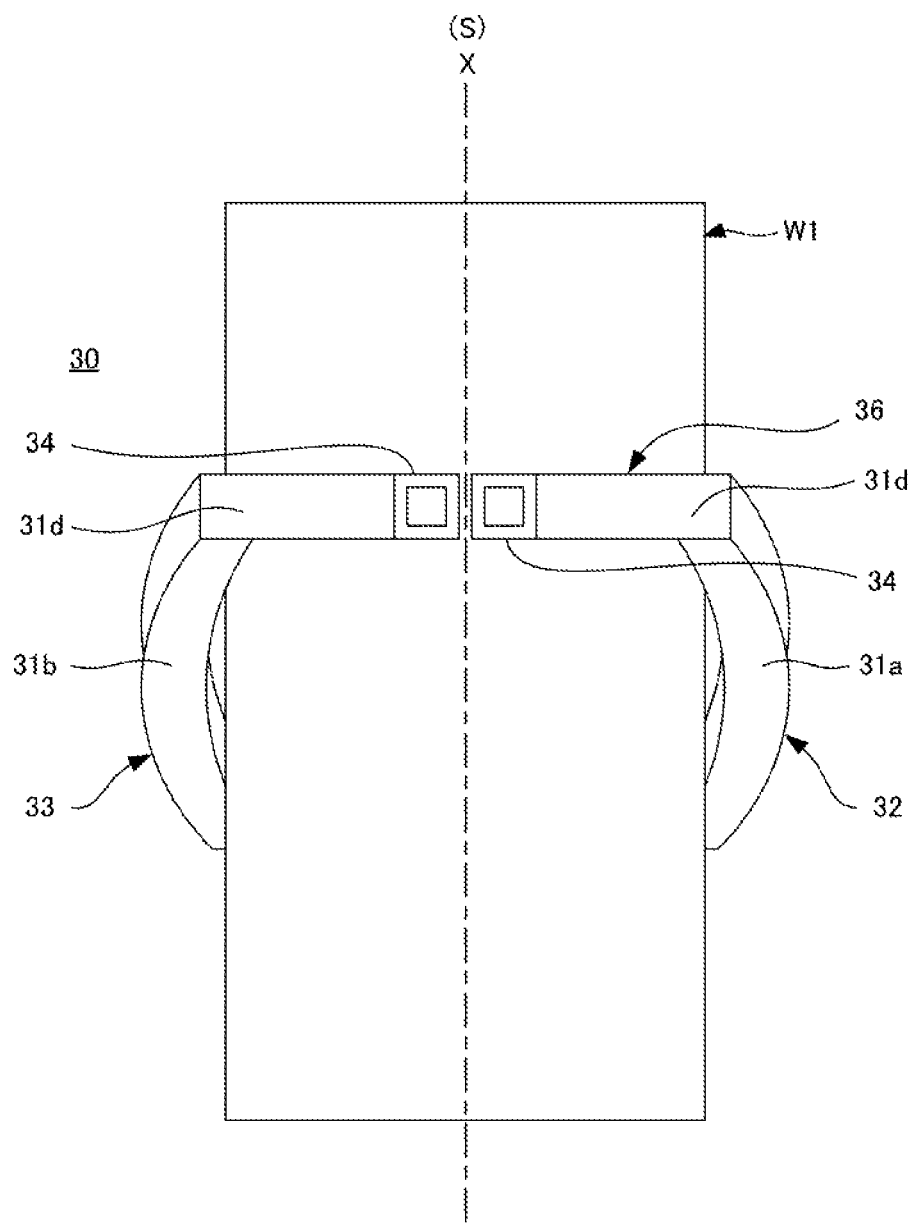
FIG. 12 is a front view of another example of a heating coil for illustrating the embodiment of the present invention.
Figure 13:
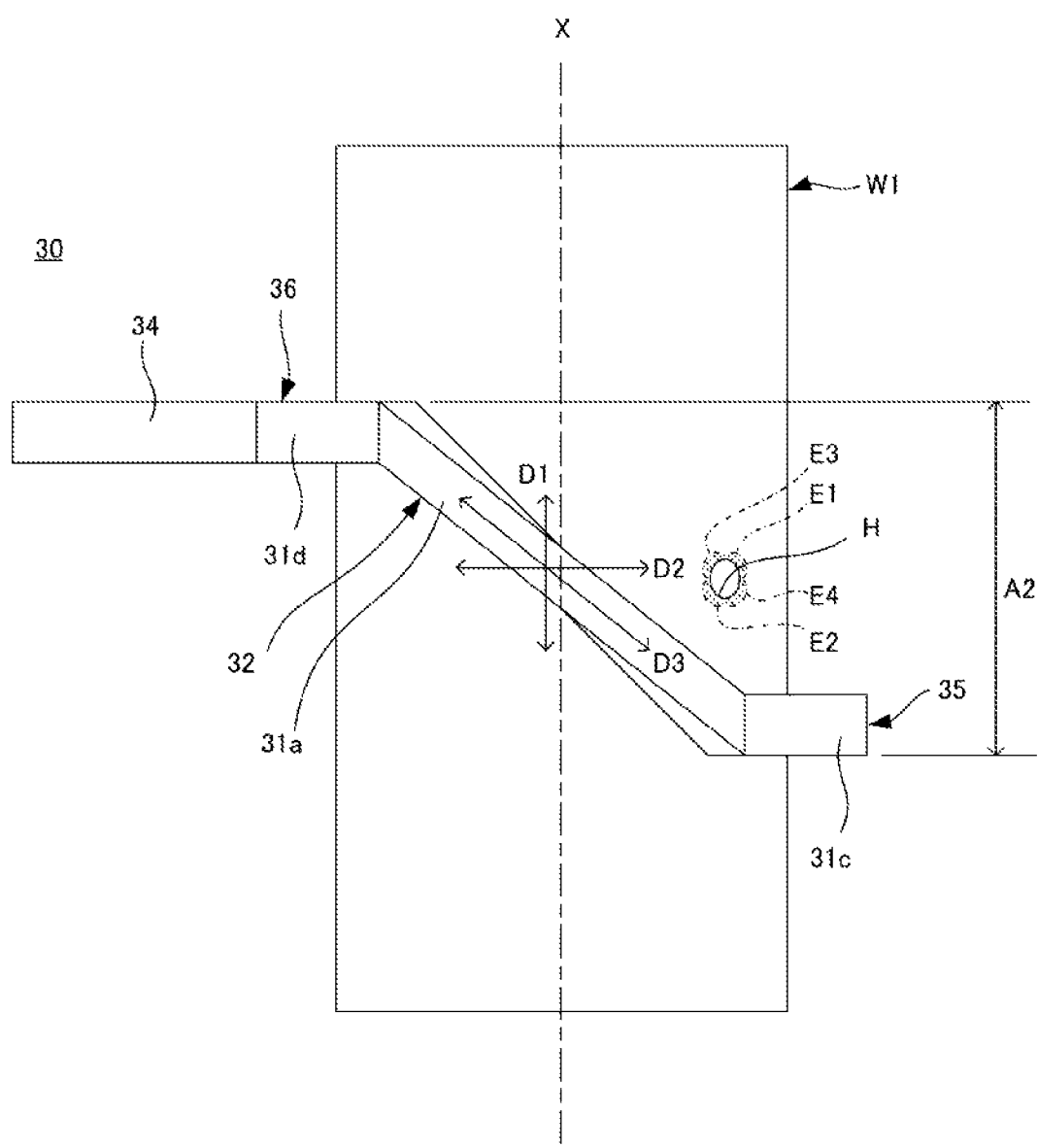
FIG. 13 is a side view of the heating coil in FIG. 12.
Figure 14:
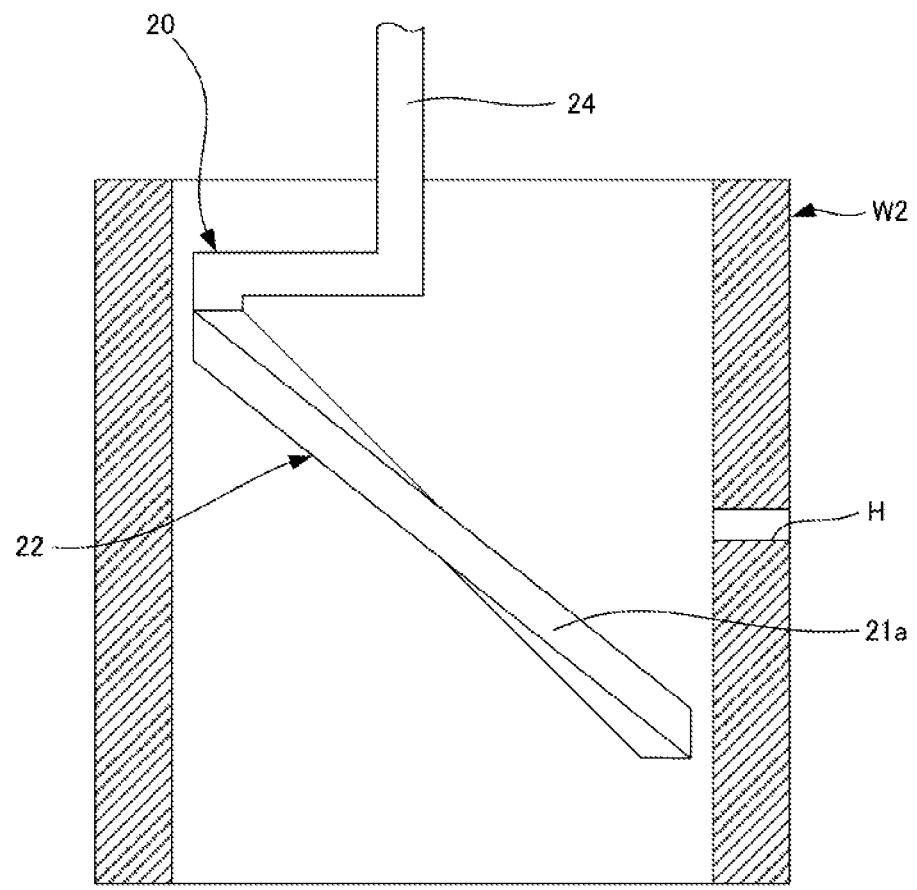
FIG. 14 is a schematic view of a modification of the heating apparatus in FIG. 1.

FIGS. 12 and 13 illustrate another example of a heating coil for illustrating the embodiment of the present invention.

A heating coil 30 illustrated in FIGS. 12 and 13 is configured such that a conductor 31 is wound along the outer peripheral surface of the workpiece W1, and is used for induction heating of the workpiece W1 in place of the heating coil 20 in the heating apparatus 1 described above.

The heating coil 30 includes a first heating unit 32, a second heating unit 33, a first connection portion 35 and a second connection portion 36.

The first heating unit 32 includes a conductor 31*a* extending in the inclination direction D3 intersecting the axial direction D1 and the circumferential direction D2 of the workpiece W1. The second heating unit 33 also includes a conductor 31*b* extending in the inclination direction D3. The first heating unit 32 and the second heating unit 33 are symmetrical with respect to the symmetry plane S including the central axis X of the workpiece W1.

In this example, the conductor 31*a* of the first heating portion 32 and the conductor 31*b* of the second heating portion 33 are formed in an arc shape having a central angle of less than 180° in top view. One end of each of the conductor 31*a* and the conductor 31*b* is connected to each other via a conductor 31*c* of the first connection portion 35. Another end of each of the conductor 31*a* and the conductor 31*b* is connected to a pair of lead portions 34 via a pair of conductors 31*d* of the second connection portion 36.

The conductor 31*c* of the first connection portion 35 which is provided adjacent to one end side of each of the conductor 31*a* of the first heating unit 32 and the conductor 31*b* of the second heating unit 33 and which connects the conductors 31*a*, 31*b* continuously extends in an arc shape in parallel with the circumferential direction D2 of the workpiece W1. The pair of conductors 31*d* of the second connection portion 36 which is provided adjacent to the other end of each of the conductors 31*a*, 31*b* and which connects the conductors 31*a*, 31*b* to the pair of lead portions 34 also extend in an arc shape in parallel with the circumferential direction D2 of the workpiece W1.

The workpiece W1 is rotated about the central axis X when the workpiece W1 is inductively heated by the heating apparatus 1 including the heating coil 30, An area A2 of the outer peripheral surface of the workpiece W1, on which the first heating unit 32, the second heating unit 33, the first connection portion 35 and the second connection portion 36 of the heating coil 30 are disposed to oppose to each other, is heated over an entire circumference.

As in the case of the heating coil 20 described above, an increase in the current density of the induced current I at the periphery of the hole H alternately occurs between the edge portions E1, E2 and the edge portions E3, E4 according to the rotation of the workpiece W1 so that the current densities of the induced current I at the edge portions E1, E2 and the edge portions E3, E4 are offset from each other, thereby the local overheating at the periphery of the hole H is reduced or prevented.

In addition, the conductor 31*c* of the first connection portion 35 and the pair of conductors 31*d* of the second connection portion 36, which are disposed to oppose to each other at two end portions in the axial direction of the area A2 on the outer peripheral surface of the workpiece W1, extend in an arc shape in parallel with the circumferential direction D2 of the workpiece W1 so that an amount of heat generated at the two end portions in the axial direction of the area A2 is relatively large. At the two end portions in the axial direction of the area A2, heat is likely to be dissipated to an outer area provided adjacent to these end portions so that a heating temperature of the area A2 can be uniformized by relatively increasing the amount of heat generated at the two end portions in the axial direction of the area A2.

Also in this example, the first heating unit 32 and the second heating unit 33 may include a plurality of conductors extending in parallel with one another. The first connection portion 32 and the second connection portion 36, which are configured to connect the conductors of the first heating unit 32 and the second heating unit 33 continuously and to connect the conductors of the first heating unit 12 and the second heating unit 33 to the pair of lead portions 34, also respectively include the plurality of conductors extending in parallel, when the first heating unit and the second heating unit 33 include the plurality of conductors.

The heating apparatus 1 including the heating coil 20 or the heating coil 30 is described as being a stationary heating apparatus. However, the heating apparatus 1 can also be configured as a movable heating apparatus that is configured to inductively heat the outer peripheral surface of the workpiece W1 over an entire length while relatively moving the heating coil 20 or the heating coil 30 and the workpiece W1 in the axial direction D1 of the workpiece W1 when the workpiece W1 is relatively long.

The heating apparatus 1 including the heating coil 20 or the heating coil 30 is described as being configured to inductively heat the outer peripheral surface of the cylindrical workpiece W1. However, the heating apparatus 1 is also applicable to induction heating of an inner peripheral surface of a cylindrical workpiece W2. Local overheating at a periphery of a hole H extending in the radial direction from the inner peripheral surface can be reduced or prevented when the hole H is formed on the workpiece W2.

Hereinafter, experimental examples are described.

Figure 5:
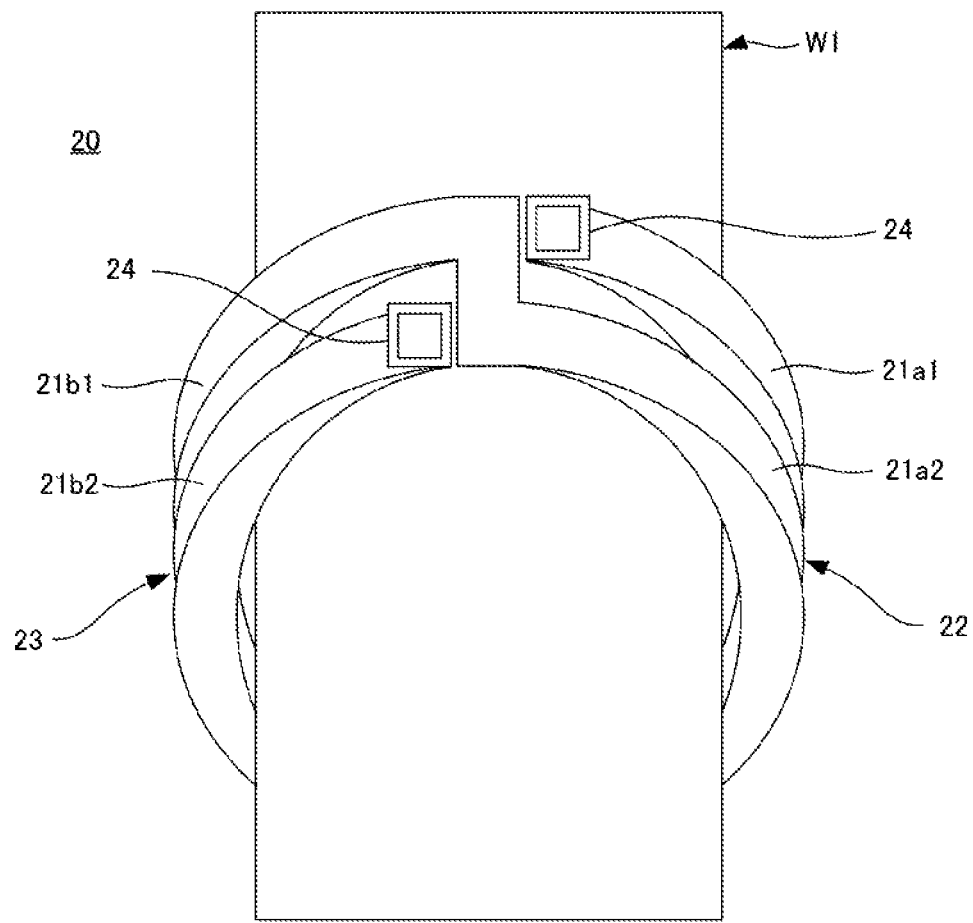
FIG. 5 is a front view of a modification of the heating coil in FIG. 1.
Figure 6:
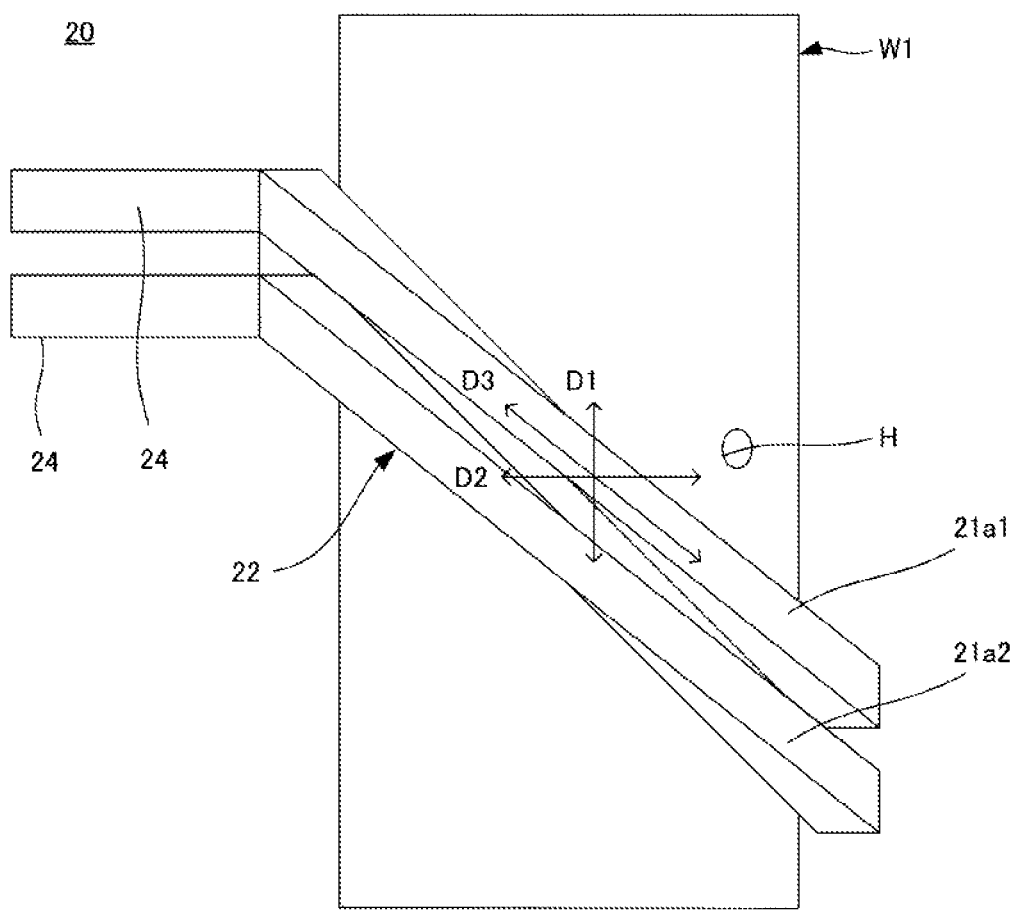
FIG. 6 is a side view of the modification of the heating coil in FIG. 1.

In Experimental Example 1, a cylindrical workpiece, which is made of an AIS14150 material JIS-SCM445 equivalent material), which has an outer diameter of 50 mm and which is formed with a hole with an inner diameter of 6 mm on an outer peripheral surface, is moved and heated using the heating coil illustrated in FIGS. 5 and 6 and is quenched after heating. In the heating coil according to Experimental Example 1, the angle θ formed between the circumferential direction D2 of the workpiece and the inclination direction D3 in Which the conductors 21a1, 21a2 of the first heating unit 22 and the conductors 21b1, 21b2 of the second heating unit 23 extend is set to 45°.

In Experimental Example 2, the same workpiece as in Experimental Example 1 is quenched using the heating coil illustrated in FIG. 8 under the same quenching conditions (moving speed, power, rotation speed and the like) as in Experimental Example 1. In the heating coil according to Experimental Example 2, the conductors 21a1, 21a2 of the first heating unit 22 and the conductors 21b1, 21b2 of the second heating unit 23 extend in parallel with the circumferential direction D2 of the workpiece and the angle θ is 0°. An outer diameter and an inner diameter of the heating coil and a conductor width are the same between the heating coil according to Experimental Example 1 and the heating coil according to Experimental Example 2.

Figure 15:
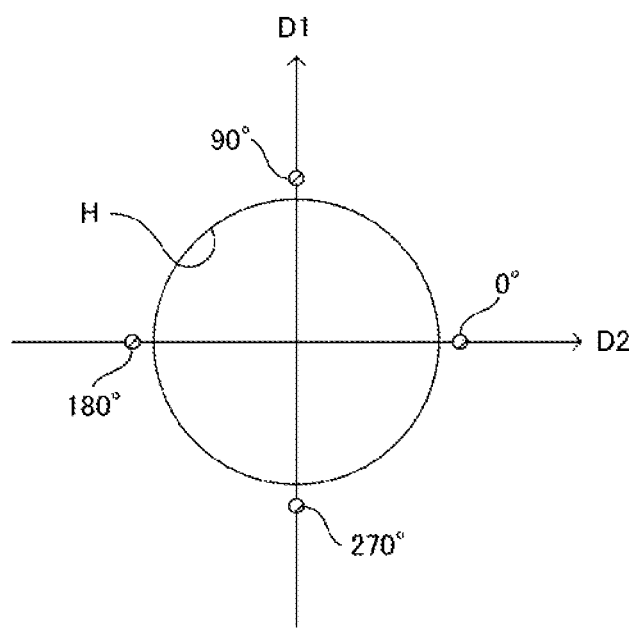
FIG. 15 is a schematic view illustrating a hardness measurement position of the quenched workpiece according to an experimental example.

As illustrated in FIG. 15, when intersection positions of a periphery of the hole of the workpiece and the circumferential direction D2 of the workpiece are set as a 0° position and a 180° position at the periphery of the hole and intersection positions of the periphery of the hole of the workpiece and the axial direction D1 of the workpiece are set as a 90° position and a 270° position at the periphery of the hole, hardness (HV 0.3) of each position of the 0° position, the 90° position, the 180° position and the 270° position at the periphery of the hole of the quenched workpiece according to Experimental Example 1 and Experimental Example 2 is measured to evaluate an effective hardened layer depth. Measurement results are shown in FIG. 16.

Figure 16:
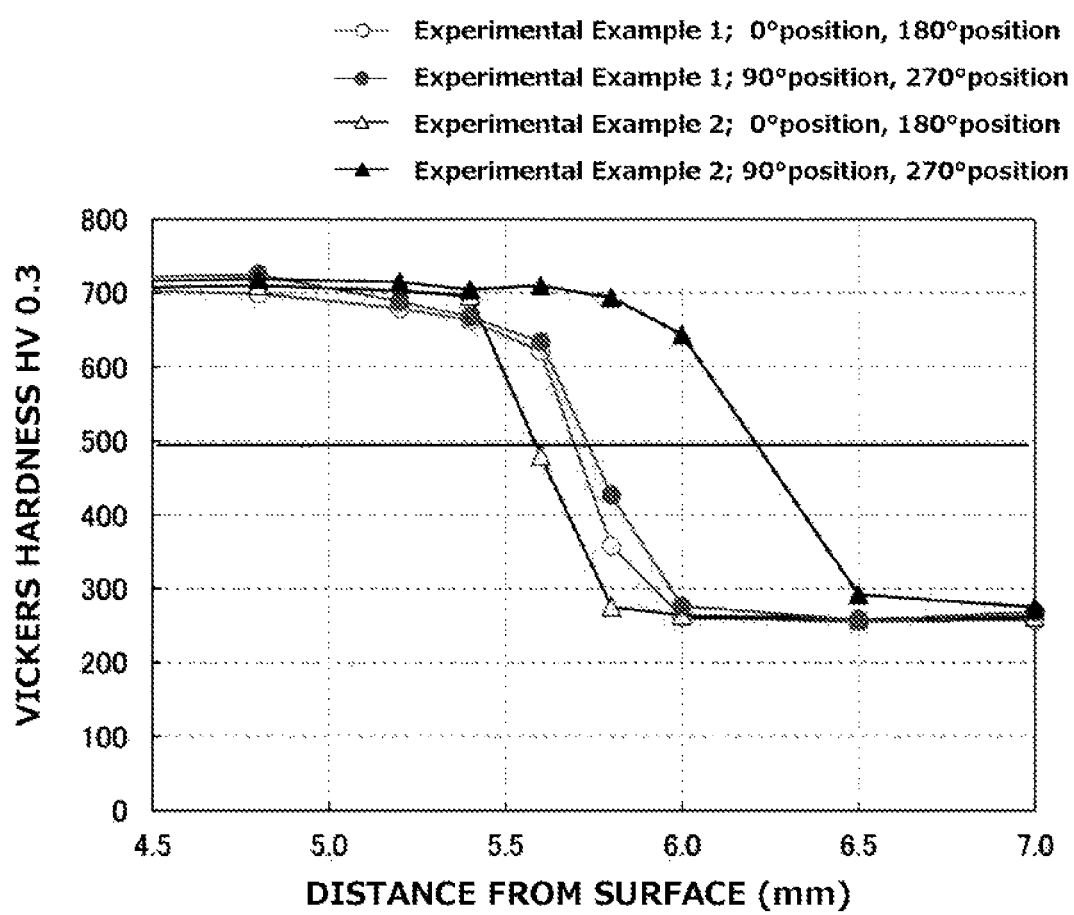
FIG. 16 is a graph showing hardness measurement results of Experimental Example 1 and Experimental Example 2.

From the measurement results shown in FIG. 16, it is understood that the effective hardened layer depths at the 90° position and the 270° position are larger than the effective hardened layer depths at the 0° position and the 180° position in Experimental Example 2. As illustrated in FIGS. 9A and 9B, in the heating coil according to Experimental Example 2, it is considered as a factor that the induction current I is concentrated on edge portions of the 90° position and the 270° position at the periphery of the hole of the workpiece so that the edge portions of the 90° position and the 270° position are overheated regardless of the rotation of the workpiece.

Meanwhile, in Experimental Example 1, the difference between the effective hardened layer depth at the 0° position and the 180° position and the effective hardened layer depth at the 90° position and the 270° position is reduced as compared to Experimental Example 2. The effective hardened layer depth at the 0° position and the 180° position and the effective hardened layer depth at the 90° position and the 270° position are almost the same. As illustrated in FIGS. 7A and 7B, according to the heating coil according to Experimental Example 1, it is recognized that the increase in the current density of the induced current alternately occurs between edge portions of a 45° position and a 225° position and edge portions of a 135° position and a 315° position according to the rotation of the workpiece so that the local overheating at the periphery of the hole is reduced or prevented and a temperature is uniformed.

Next, in Experimental Example 3, a cylindrical workpiece, which is made of a JIS-S55C material, which has an outer diameter of 38.5 mm and which is formed with a hole with an inner diameter of 8.5 mm on an outer peripheral surface, is fixedly heated using the heating coil illustrated in FIGS. 2 to 4 and is quenched after heating. In the heating coil according to Experimental Example 3, the angle θ formed between the circumferential direction D2 of the workpiece and the inclination direction D3 in which the conductors 21a of the first heating unit 22 and the conductors 21b of the second heating unit 23 extend is set to 40°.

In Experimental Example 4, the same workpiece as in Experimental Example 3 is quenched using the heating coil illustrated in FIG. 10 under the same quenching conditions (power, rotation speed and the like) as in Experimental Example 3. In the heating coil according to Experimental Example 4, the conductors 21a of the first heating unit 22 and the conductors 21b of the second heating unit 23 extend in parallel with the axial direction D1 of the workpiece and the angle θ is 90°.

The hardness (HV 0.3) of each position of the 0° position, the 90° position, the 180° position and the 270° position at the periphery of the hole of the quenched workpiece according to Experimental Example 3 and Experimental Example 4 is measured to evaluate the effective hardened layer depth. Measurement results are shown in FIG. 17.

Figure 17:
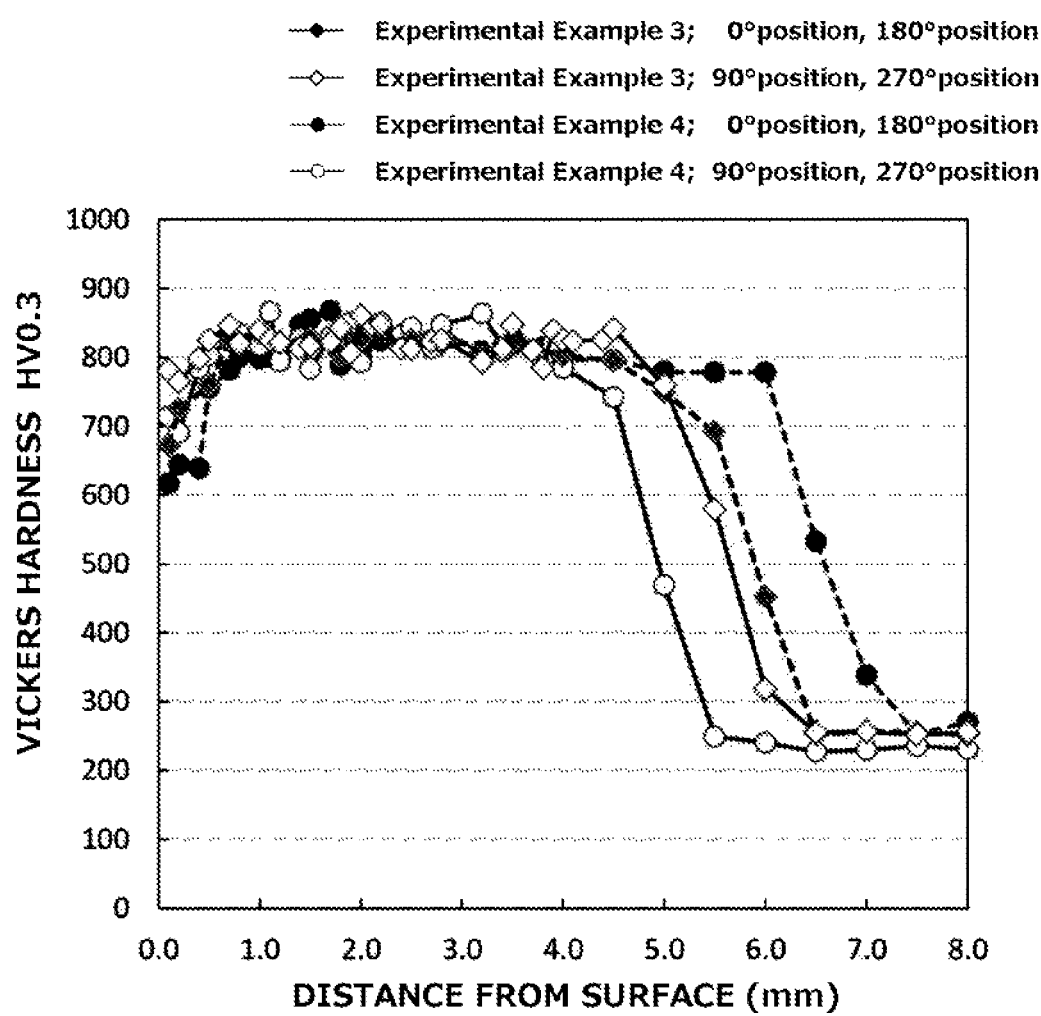
FIG. 17 is a graph showing hardness measurement results of Experimental Example 3 and Experimental Example 4.

From the measurement results shown in FIG. 17, it is understood that the effective hardened layer depths at the 0° position and the 180° position are larger than the effective hardened layer depths at the 90° position and the 270° position in Experimental Example 4. As illustrated in FIGS. 11A and 11B, in the heating coil according to Experimental Example 4, it is considered as a factor that the induction current I is concentrated on edge portions of the 0° position and the 180° position at the periphery of the hole of the workpiece so that the edge portions of the 0° position and the 180° position are overheated regardless of the rotation of the workpiece.

Meanwhile, in Experimental Example 3, the difference between the effective hardened layer depth at the 0° position and the 180° position and the effective hardened layer depth at the 90° position and the 270° position is reduced as compared to Experimental Example 4. The effective hardened layer depth at the 0° position and the 180° position and the effective hardened layer depth at the 90° position and the 270° position are almost the same. As illustrated in FIGS. 7A and 7B, according to the heating coil according to Experimental Example 4, it is recognized that the increase in the current density of the induced current alternately occurs between edge portions of a 50° position and a 230° position and edge portions of a 130° position and a 310° position according to the rotation of the workpiece so that the local overheating at the periphery of the hole is reduced or prevented and the temperature is uniformed.

In accordance with the embodiments, a heating coil (20, 30) is configured to induction heat an outer peripheral surface of a workpiece (W1) which has a cylindrical peripheral surface and which is formed with a hole (H) extending from the cylindrical peripheral surface in a radial direction of the workpiece. As shown in figures, the heating coil (20, 30) includes: a first heating unit (22, 32) including at least one conductor (21a, 21a1 21a2, 31a) which is configured to extend along the outer peripheral surface of the workpiece (W1) when the workpiece (W1) is placed in the heating coil (20, 30); and a second heating unit (23, 33) including at least one conductor (21b, 21b1, 21b2, 31b) which is configured to extend along the outer peripheral surface of the workpiece (W1) when the workpiece (W) is placed in the heating coil (20, 30), The conductor (21a, 21a1 21a2, 31a) of the first heating unit (22, 32) and the conductor (21b, 21b1, 21b2, 31b) of the second heating unit (23, 33) are configured to be symmetrically arranged with respect to a symmetry plane (S) including a central axis (X) of the outer peripheral surface of the workpiece (W1) when the workpiece (W1) is placed in the heating coil (20, 30). The conductor (21a, 21a1 21a2, 31a) of the first heating unit (22, 32) extends in an inclination direction (D3) intersecting an axial direction (D1) and a circumferential direction (D2) of the outer peripheral surface of the workpiece (W1) when the workpiece (W1) is placed in the heating coil (20, 30). The conductor (21b, 21b1, 21b2, 31b) of the second heating unit (23, 33) extends in an inclination direction (D3) intersecting the axial direction (D1) and the circumferential direction (D2) of the outer peripheral surface of the workpiece (W1) when the workpiece (W1) is placed in the heating coil (20, 30).

As shown in figures, the first heating unit (22, 32) includes a plurality of conductors (21a 1, 21a2) extending in parallel with one another. The second heating unit (23, 33) includes a plurality of conductors (21b1, 21b2) extending in parallel with one another.

As shown in figures, an angle between the circumferential direction (D2) of the outer peripheral surface of the workpiece (W1) and the inclination direction (D3) of the conductor (21a, 21a1 21a2, 31a) of the first heating unit (22, 32) is 40° or more and 50° or less. An angle between the circumferential direction (D2) of the outer peripheral surface of the workpiece (W1) and the inclination direction (D3) of the conductor (21b, 21b1, 21b2, 31b) of the second heating unit (23, 33) is 40° or more and 50° or less.

As shown in figures, a width (W) of the conductor (21a, 21a1, 21a2, 31a) of the first heating unit (22, 32) is greater than a diameter of the hole (H) in the workpiece (W1). A width (W) of the conductor (21b, 21b1, 21b2, 31b) of the second heating unit (23, 33) is greater than the diameter of the hole (H) in the workpiece (W1).

As shown in figures, the width (W) of the conductor (21a, 21a1, 21a2, 31a) of the first heating unit (22, 32) is 2 times or more of the diameter of the hole (H) in the workpiece (W1) and 3 times or less of the diameter of the hole (H) in the workpiece. (W1). The width (W) of the conductor (21b, 21b1, 21b2, 31b) of the second heating unit (23, 33) is 2 times or more of the diameter of the hole (H) in the workpiece (W1) and 3 times or less of the diameter of the hole (H) in the workpiece (W1).

As shown in figures, the heating coil (30) includes a first connection portion (35) provided adjacent to an end of the conductor (31a) of the first heating unit (32) and an end of the conductor (31b) of the second heating unit (33), and connects the conductor (31a) of the first heating unit (32) and the conductor (31b) of the second heating unit (33) continuously to each other; and second connection portions (36) that respectively connects the conductors (31a, 31b) of the first heating unit (32) and the second heating unit (33) to a pair of lead portions (34) electrically connected to a power supply (2). A conductor (31c) of the first connection portion (35) extends in parallel with the circumferential direction (D2) of the outer peripheral surface of the workpiece (W1). Conductors (31d) of the second connection portions (36) respectively extend in parallel with the circumferential direction (D2) of the outer peripheral surface of the workpiece (W1).

In accordance with embodiments, a heating apparatus (1) is configured to induction heat an outer peripheral surface of a workpiece (W1) which has a cylindrical peripheral surface and which is formed with a hole (H) extending from the cylindrical peripheral surface in a radial direction of the workpiece. As shown in figures, the heating apparatus (1) includes a heating coil (20, 30) and a pair of centers (12, 12) configured to support the workpiece (W1). As shown in figures, a line connecting the pair of centers (12, 12) defines a central axis (X). The heating coil (20, 30) includes; a first heating unit (22, 32) including at least one conductor (21a, 21a1 21a2, 31a); and a second heating unit (23, 33) including at least one conductor (21b, 21b1, 21b2, 31b). The conductor (21a, 21a1, 21a2, 31a) of the first heating unit (22, 32) and the conductor (21b, 21b 1, 21b2, 31b) of the second heating unit (23, 33) are to be symmetrically arranged with respect to a symmetry plane (S) including the central axis (X). The conductor (21a, 21a1, 21a2, 31a) of the first heating unit (22, 32) extends in an inclination direction (D3) intersecting an axial direction (D1) which is parallel to the central axis (X) and a direction (D2) which is perpendicular to the central axis (X). The conductor (21b, 21b 1, 21b2, 31b) of the second heating unit (23, 33) extends in an inclination direction (D3) intersecting the axial direction (D1) which is parallel to the central axis (X) and the direction (D2) which is perpendicular to the central axis (X).

As shown in figures, an angle between the direction (D2) which is perpendicular to the central axis (X) and the inclination direction (D3) of the conductor (21a, 21a1, 21a2, 31a) of the first heating, unit (22, 32) is 40° or more and 50° or less. An angle between the direction (D2) which is perpendicular to the central axis (X) and the inclination direction (D3) of the conductor (21b, 21b1, 21b2, 31b) of the second heating unit (23, 33) is 40° or more and 50° or less.

In accordance with embodiments, a workpiece is manufactured by: placing a workpiece (W1) in a heating coil (20, 30), the workpiece (W1) having a cylindrical peripheral surface and formed with a hole (H) extending from the cylindrical peripheral surface in a radial direction of the workpiece (W1); and supplying high frequency AC power to the heating coil (20, 30). As shown in figures, the heating coil (20, 30) includes: a first heating unit (22, 32) including at least one conductor (21a, 21a 1, 21a2, 31a) which extends along the outer peripheral surface of the workpiece (W1); and a second heating unit (23, 33) including, at least one conductor (21b, 21b1, 21b2, 31b) which extends along the outer peripheral surface of the workpiece (W1). The conductor (21a, 21a1, 21a2, 31a) of the first heating unit 22, 31) and the conductor (21b, 21b1, 21b2, 31b) of the second heating unit (23, 33) are to be symmetrically arranged with respect to a symmetry plane (S) including a central axis (X) of the outer peripheral surface of the workpiece (W1) when the workpiece (W1) is placed in the heating coil (20, 30). The conductor (21a, 21a1, 21a2, 31a) of the first heating unit (22, 32) extends in an inclination direction (D3) intersecting an axial direction (D1) and a circumferential direction (D2) of the outer peripheral surface of the workpiece (W1) when the workpiece (W1) is placed in the heating coil (20, 30). The conductor (21b, 21b 1 21b2, 31b) of the second heating unit (23, 33) extends in an inclination direction (D3) intersecting the axial direction (D1) and the circumferential direction (D2) of the outer peripheral surface of the workpiece (W1) when the workpiece (W1) is placed in the heating coil (20, 30).

As shown in figures, an angle between the circumferential direction (D2) of the outer peripheral surface of the workpiece (W1) and the inclination direction (D3) of the conductor (21a, 21a1, 21a2, 31a) of the first heating unit (22, 32) is 40° or more and 50° or less. An angle between the circumferential direction (D2) of the outer peripheral surface of the workpiece (W1) and the inclination direction (D3) of the conductor (21b, 21b1, 21b2, 31b) of the second heating unit (23, 33) is 40° or more and 50° or less.

This application is based on Japanese Patent Application No. 2018-100577 filed on May 25, 2018, the entire content of which is incorporated herein by reference.

The invention claimed is:

1. A heating coil configured to induction heat an outer peripheral surface of a workpiece which has a cylindrical peripheral surface and which is formed with a hole extending from the cylindrical peripheral surface in a radial direction of the workpiece, the heating coil comprising:
    a first heating unit including at least one conductor which is configured to extend along the outer peripheral surface of the workpiece when the workpiece is placed in the heating coil; and
    a second heating unit including at least one conductor which is configured to extend along the outer peripheral surface of the workpiece when the workpiece is placed in the heating coil,
    wherein the conductor of the first heating unit and the conductor of the second heating unit are configured to be symmetrically arranged and mirror images of each other in plain view with respect to a symmetry plane in which a central axis of the outer peripheral surface of the workpiece is contained when the workpiece is placed in the heating coil,
    wherein the conductor of the first heating unit extends in an inclination direction intersecting an axial direction and a circumferential direction of the outer peripheral surface of the workpiece when the workpiece is placed in the heating coil,
    wherein the conductor of the second heating unit extends in an inclination direction intersecting the axial direction and the circumferential direction of the outer peripheral surface of the workpiece when the workpiece is placed in the heating coil,
    wherein a width of the conductor of the first heating unit is greater than a diameter of the hole in the workpiece, and
    wherein a width of the conductor of the second heating unit is greater than the diameter of the hole in the workpiece.

2. The heating coil according to claim 1,
    wherein the first heating unit includes a plurality of conductors extending in parallel with one another, and
    wherein the second heating unit includes a plurality of conductors extending in parallel with one another.

3. The heating coil according to claim 1,
    wherein an angle between the circumferential direction of the outer peripheral surface of the workpiece and the inclination direction of the conductor of the first heating unit is 40° or more and 50° or less, and
    wherein an angle between the circumferential direction of the outer peripheral surface of the workpiece and the inclination direction of the conductor of the second heating unit is 40° or more and 50° or less.

4. The heating coil according to claim 1,
    wherein the width of the conductor of the first heating unit is 2 times or more of the diameter of the hole in the workpiece and 3 times or less of the diameter of the hole in the workpiece, and
    the width of the conductor of the second heating unit is 2 times or more of the diameter of the hole in the workpiece and 3 times or less of the diameter of the hole in the workpiece.

5. The heating coil according to claim 1, further comprising:
    a first connection portion provided adjacent to an end of the conductor of the first heating unit and an end of the conductor of the second heating unit, the first connection portion connecting the conductor of the first heating unit and the conductor of the second heating unit continuously to each other; and
    second connection portions that respectively connect the conductors of the first heating unit and the second heating unit to a pair of lead portions electrically connected to a power supply,
    wherein a conductor of the first connection portion extends in parallel with the circumferential direction of the outer peripheral surface of the workpiece, and
    wherein conductors of the second connection portions respectively extend in parallel with the circumferential direction of the outer peripheral surface of the workpiece.

6. A heating apparatus configured to induction heat an outer peripheral surface of a workpiece which has a cylindrical peripheral surface and which is formed with a hole extending from the cylindrical peripheral surface in a radial direction of the workpiece, the heating apparatus comprising:
    a heating coil; and
    a pair of centers configured to support the workpiece,
    wherein a line connecting the pair of centers defines a central axis,
    wherein the heating coil includes:
        a first heating unit including at least one conductor; and
        a second heating unit including at least one conductor,
    wherein the conductor of the first heating unit and the conductor of the second heating unit are to be symmetrically arranged and mirror images of each other in plain view with respect to a symmetry plane in which the central axis is contained,
    wherein the conductor of the first heating unit extends in an inclination direction intersecting an axial direction which is parallel to the central axis and a direction which is perpendicular to the central axis,
    wherein the conductor of the second heating unit extends in an inclination direction intersecting the axial direction which is parallel to the central axis and the direction which is perpendicular to the central axis,
    wherein a width of the conductor of the first heating unit is greater than a diameter of the hole in the workpiece, and
    wherein a width of the conductor of the second heating unit is greater than the diameter of the hole in the workpiece.

7. The heating apparatus according to claim 6,
    wherein an angle between the direction which is perpendicular to the central axis and the inclination direction of the conductor of the first heating unit is 40° or more and 50° or less, and
    wherein an angle between the direction which is perpendicular to the central axis and the inclination direction of the conductor of the second heating unit is 40° or more and 50° or less.

8. A manufacturing method of a workpiece, the manufacturing method comprising:
    placing a workpiece in a heating coil, the workpiece having a cylindrical peripheral surface and formed with a hole extending from the cylindrical peripheral surface in a radial direction of the workpiece; and
    supplying high frequency AC power to the heating coil, wherein the heating coil includes:

a first heating unit including at least one conductor which extends along the outer peripheral surface of the workpiece; and a second heating unit including at least one conductor which extends along the outer peripheral surface of the workpiece, wherein the conductor of the first heating unit and the conductor of the second heating unit are to be symmetrically arranged and mirror images of each other in plain view with respect to a symmetry plane in which a central axis of the outer peripheral surface of the workpiece is contained when the workpiece is placed in the heating coil, wherein the conductor of the first heating unit extends in an inclination direction intersecting an axial direction and a circumferential direction of the outer peripheral surface of the workpiece when the workpiece is placed in the heating coil, wherein the conductor of the second heating unit extends in an inclination direction intersecting the axial direction and the circumferential direction of the outer peripheral surface of the workpiece when the workpiece is placed in the heating coil, wherein a width of the conductor of the first heating unit is greater than a diameter of the hole in the workpiece, and wherein a width of the conductor of the second heating unit is greater than the diameter of the hole in the workpiece.

9. The manufacturing method according to claim 8, wherein an angle between the circumferential direction of the outer peripheral surface of the workpiece and the inclination direction of the conductor of the first heating unit is 40° or more and 50° or less, and wherein an angle between the circumferential direction of the outer peripheral surface of the workpiece and the inclination direction of the conductor of the second heating unit is 40° or more and 50° or less.

* * * * *